United States Patent [19]
Chow et al.

[11] Patent Number: 5,656,741
[45] Date of Patent: Aug. 12, 1997

[54] PROCESS AND REAGENTS FOR PROCESSING SYNTHETIC OLIGONUCLEOTIDES

[75] Inventors: Flora Chow; Tomas Kempe, both of Bowie, Md.

[73] Assignee: Barrskogen, Inc., Bowie, Md.

[21] Appl. No.: 435,526

[22] Filed: May 5, 1995

Related U.S. Application Data

[63] Continuation of Ser. No. 139,911, filed as PCT/US93/03123, Mar. 29, 1993, abandoned, which is a continuation-in-part of Ser. No. 860,092, Mar. 30, 1992, abandoned.

[51] Int. Cl.$^6$ .......................... C07H 21/00; C07H 21/04; C07H 21/02; C07H 19/00

[52] U.S. Cl. .......... 536/25.3; 536/22.1; 536/24.3; 536/24.31; 536/24.32; 536/24.33

[58] Field of Search ........................ 536/22.1, 24.3, 536/24.31, 24.33, 25.3

[56] References Cited

U.S. PATENT DOCUMENTS 4,711,955  12/1987  Ward et al. .................... 536/29

OTHER PUBLICATIONS

Sambrook et al., "Molecular cloning: A laboratory manual, 2nd edition", pp. 1.38–1.39, Cold Spring Harbor Press, Plainview, N.Y. 1989.
Polushin et al. (1991), Bioorg Khim 17(8), 1148 (Abstract Only).
Reynolds et al. (1992), Biotechniques 12(4), 518–521.
Vu et al. (1990). Tetrahed. Lett. 31(50), 7269–7272.
T. Brown and D. Brown, "Modern machine–aided Methods of Oligonucleotide Synthesis," Chapter 1, pp. 1–24 in *Oligonucleotides and Analogues, A Practical Approach*, F. Eckstein, ed., IRL Press (1991).
H. Weber and H.G. Khorana, *J. Mol. Biol.*, 72:219–249 (1972).
Schulhoff, et al., *Nucleic Acids Research*, 15:397–416 (1987).
Schaller, et al., *J. Amer. Chem. Soc.*, 85, 3821–3827 (1963).
Buchi and Khorana, *J. Mol. Biol.*, 72, 251 (1972).
Koster, et al., *Tetrahedron*, 37:363–369 (1981).
Sinha, et al., *Biochimie*, 75: 13–23 (1993).
Dreyer and Dervan, *Proc. Nat'l. Aca. Sci.*, 82:968–972 (1985).
Griffin and Dervan, *J. Am. Chem. Soc.*, 114:7976–7982 (1992).
Sambrook et al. (1989) "Molecular Cloning: A Laboratory Manual, 2nd Ed.", p. 11.34, Cold Spring Harbor Press, Plainview, N.Y.

*Primary Examiner*—Mindy Fleisher
*Assistant Examiner*—Bonnie D. Weiss
*Attorney, Agent, or Firm*—Fredrikson & Byron, P.A.

[57] ABSTRACT

Reagents useful for the rapid processing of synthetic oligonucleotides, including a basic reagent for the cleavage and deprotection of the synthesized oligonucleotides from a support, and a precipitating reagent useful for recovering the synthesized oligonucleotide by precipitation from solution. The basic reagent optionally includes a wetting agent useful for the cleavage from lipophilic supports.

11 Claims, No Drawings

PROCESS AND REAGENTS FOR PROCESSING SYNTHETIC OLIGONUCLEOTIDES

CROSS REFERENCE TO RELATED APPLICATIONS

This application is a continuation, of application Ser. No. 08/139,911, filed Oct. 19, 1993, abandoned, which is a continuation-in-part of co-pending Patent Cooperation Treaty (PCT) application Ser. No. PCT/US93/03123 (filed Mar. 29, 1993), which, in turn, is a continuation-in-part of U.S. application Ser. No. 07/860,092, filed Mar. 30, 1992 and now abandoned.

TECHNICAL FIELD

The present invention relates to a process useful for the removal, recovery, deprotection, and/or purification of biopolymers such as synthetic oligonucleotides attached to a solid matrix, as well as to reagents useful in such a process.

BACKGROUND OF THE INVENTION

The principle of solid phase oligonucleotide synthesis traces its history to work of Merrifield, Khorana and others in the 1950's and 1960's. The development of automated synthetic methods over the past decade has had a major impact in the fields of molecular biology and biological chemistry.

The stepwise synthesis of deoxyoligonucleotides generally involves the formation of successive phosphodiester bonds between 5'-hydroxyl groups of bound nucleotide derivatives and the 3'-hydroxyl groups of a succession of free nucleotide derivatives.

The synthetic process typically begins with the attachment of a nucleoside derivative at its 3'-terminus by means of a linker arm to a solid support, such as silica gel or beads of borosilicate glass (also known as controlled pore glass, "CPG") packed in a column.

The ability to activate one group of the free nucleotide derivative requires that other potentially active groups elsewhere in the reaction mixture be "protected" by reversible chemical modification. The reactive nucleotide derivative is a free monomer in which the 3'-phosphate group has been substituted, e.g., by dialkylphosphoamidite, which upon activation reacts with the free 5'-hydroxyl group of the bound nucleoside or oligonucleotide to yield a phosphite triester. The phosphite triester is then oxidized to a stable phosphotriester before the next synthetic step.

The 3'-hydroxyl of the immobilized reactant is protected by virtue of its attachment to the support, and the 5'-hydroxyl of the free monomer can be protected by a dimethoxytrityl ("DMT") group in order to prevent self-polymerization.

Additionally, the reactive groups on the individual bases are also protected. A variety of chemistries have been developed for the protection of the nucleoside exocyclic amino groups. The use of N-acyl protecting groups to prepare N-acylated deoxynucleosides has found wide acceptance for such purposes.

After each reaction excess reagents are washed off the column, any nonreacted 5'-hydroxyl groups are blocked or "capped" using acetic anhydride, and the 5'-DMT group is removed using either 80% acetic acid, or dichloro- or trichloro-acetic acid in dichloromethane, to allow the extended bound oligomer to react with another activated monomer in the next round of synthesis.

Synthetic methodologies that were in common use only a decade ago, such as the phosphodiester method, are now largely obsolete. Today almost all synthetic oligonucleotides are prepared by solid phase phosphoramidite techniques. See generally T. Brown and D. Brown, "Modem machine-aided Methods of Oligonucleotide Synthesis", Chapter 1, pp. 1–24 in *Oligonucleotides and Analogues, A Practical Approach*, F. Eckstein, ed., IRL Press (1991); and H. Weber and H. G. Khorana, *J. Mol. Biol.*, 72: 219–249 (1972).

Upon completion of synthesis, the solid phase bound oligomer is removed from the support (cleaved) and deprotected in order to remove all remaining protecting groups from the oligonucleotide. Typically, the cleavage is performed at room temperature using concentrated ammonium hydroxide (30% by volume) while the solid support is kept in the synthesis column. The amount of ammonium hydroxide used for the cleavage generally ranges from 1 ml to 3 ml. The ammonium hydroxide can be delivered to one end of the column through one syringe and collected at the other end in another syringe. The feeding of ammonium hydroxide through the column is repeated several time during the cleavage process, which typically is performed for 1–2 hours (see, e.g., protocol 5 of Brown and Brown, cited above, as well as Schulhoff, et al., *Nucleic Acids Research*, 15: 397–416 (1987)

After completion of the cleavage of the oligomers from the support, the remaining protecting groups on the nucleotide building blocks are removed by incubation in an ammonium hydroxide solution. The incubation is typically carried out either at room temperature for 24 hours, or with heating, e.g., by heating to 55°–60° C. for 6–17 hours; to 70° C. for about 3 hours; or to 85° C. for 30–60 minutes. The heating of ammonium hydroxide, especially above 55° C. is potentially dangerous however, due to build-up of pressure within the tube or vial.

The cleavage/deprotection can also be performed in a separate vial if the column is opened up and the contents emptied into the vial. Ammonium hydroxide is added, the vial is sealed, and the contents are then incubated with ammonium hydroxide as described above. Drawbacks associated with this method include the additional labor required to open the column, together with the corresponding potential loss or solubilization of support material, as well as the need to separate the support from the ammonium hydroxide prior to evaporation.

The particular cleavage and deprotection protocol used in any situation is largely determined by the chemistry of the protecting groups used for the DNA building blocks. The use of some protecting groups dates back 25 years, to the early work of Schaller et al., *J. Amer. Chem. Soc.* 85, 3821–3827 (1963), Buchi and Khorana, *J. Mol. Biol.* 72, 251 (1972)). These groups include benzoyl(bz) and isobutyryl(i-bu) protecting groups of adenosine A(bz), cytosine C(bz) and guanosine G(i-bu). Generally, thymidine T is not protected.

More labile protecting groups of the phenoxyacetyl type have recently been introduced commercially (e.g., Expedite™ and "PAC" amidites introduced by Millipore and Pharmacia, respectively). These types of protecting groups have been known for some time and their stability as monomer nucleosides have been studied. See, for instance, Koster et al., *Tetrahedron*, 37: 363–369 (1981) which describes the use of a 1:1 methanol:NaOH mixture as a deacylating agent to determine the stability of various N-protecting groups.

Their use in DNA synthesis has also been investigated (Schulhoff, et al., *Nucleic Acids Research*, 15: 397–416

(1987), Schulhoff, et al. *Nucleic Acids Research.*, 16: 319 (1988), and Sinha et al., *Biochimie,* 75: 13-23 (1993)). The conventional protecting groups A(bz), C(bz) and G(i-bu), however, will likely continue to dominate the DNA synthesis field for a long time since it appears that they tend to be more stable in storage and use.

The increased reactivity of the new, more labile, protecting groups also require precautions during synthesis. The capping reagent acetic anhydride/pyridine/methylimidazole is typically replaced with a capping reagent that provides the same function as the protecting groups (e.g., t-butylphenoxyacetic anhydride instead of acetic anhydride), thereby providing for an easy exchange of such groups on the nucleosides.

According to instructions provided by the manufacturer, DNA made using the Expedite™ amidites can be deprotected by incubation for 15 minutes at 55° C. or 2 hours at room temperature. If the DNA is first cleaved from the solid support (using concentrated Ammonium hydroxide) while still in the column the cleavage time is set at 90 minutes at room temperature. If the support is instead emptied into a vial containing ammonium hydroxide, the combined cleavage and deprotection time is 15 minutes at 55° C., or 2 hours at room temperature. (See "Instructions for using Expedite Chemistry", Millipore).

In yet another approach, Beckman company has recently introduced a "One-Hour DNA" technology involving the use of what are described as "acetyl-protected deoxyC phosphoamidites". Beckman describes the cleavage and deprotection as taking ten minutes, followed by drying of an aliquot of the sample within another ten minutes. The technology appears to be limited in that it appears to again be an ammonia-based method that relies on the volatility of the ammonium hydroxide for the rapid drying time. It also appears to require the use of a dedicated "synthesizer" instrument, that itself is of limited capacity as well as new amidite chemistry.

Sodium hydroxide has found limited use for the cleavage or deprotection of modified DNA, but does not appear to have been previously used or described for use in the preparation of synthetic oligonucleotides. For instance, Dreyer and Dervan, *Proc. Nat'l. Acad. Sci.*, 82: 968-972 (1985) describe the use of 0.1 molar sodium hydroxide to cleave oligomer from a support for 6 hours at room temperature. Griffin and Dervan, *J. Am. Chem. Soc.*, 114: 7976-7982 (1992) describe a sodium hydroxide deprotection time of 20 hours wherein the recovery procedures is estimated to take 2-3 days. It is of interest to note that the authors in each case used the traditional ammonium hydroxide cleavage/deprotection protocol for non-modified DNA (i.e., naturally occurring DNA). The methodology used in the sodium hydroxide procedure differs significantly from the traditional ammonium hydroxide protocol, and the overall sodium hydroxide-based protocol still required on the order of days.

Following cleavage and deprotection, synthesized DNA is typically recovered by evaporation. Evaporation of 1-3 ml of ammonium hydroxide on a standard laboratory evaporator (Speedvac®, Savant) takes between 1.5-3 hours. If the DNA is fully deprotected, it can generally be used directly in molecular biology applications, or it can be further purified. The purification of fully deprotected DNA is more tedious than the purification of DMT-DNA. The purification of fully deprotected DNA is usually done by ion exchange chromatography or by gel purification. Such operations, including final evaporation, often take at least one full day to perform. Using modern automated DNA synthesizers and high quality reagents, synthetic DNA is typically not purified, particularly when recovered in the fully deprotected state. The DMT-DNA is more suitable for rapid purification, in methods where the lipophilic DMT group can be used in affinity purification. The purification scheme on a cartridge takes about 20 minutes and the final evaporation about 2 hours, before the DNA is ready to be used.

As an alternative to evaporation, precipitation of naturally-occurring DNA has been used for purification purposes. For synthetic DNA, however, precipitation is not typically used as a recovery means, although the possibility has been recently introduced. A product identified as "Oligoclean™" has been introduced by United States Biochemical Corporation, Cleveland, Ohio. This product appears to contain alcohol and acetic acid.

The manufacturer's recommended procedure for oligonucleotide purification using the Oligoclean™ product involves the addition of 1 ml of that product to 0.1 ml of concentrated ammonium hydroxide. This is followed by incubation at -20° C. for 45 minutes, or overnight for shorter oligonucleotides or those high in A-T content.

It would appear that the Oligoclean™ product would not be particularly useful for the recovery of synthetic DNA, since considerably more ammonium hydroxide is typically used in traditional ammonium hydroxide cleavage protocols (e.g., on the order of 3 ml). Using 3 ml of ammonium hydroxide, for instance, the Oligoclean™ procedure recommended by the manufacturer would need to be repeated about 30 times in order to recover the entire sample.

One reason that ammonium-based cleavage procedures have not been traditionally followed by recovery by precipitation may be related to the increased solubility of the resultant DNA ammonium, as compared to that of a DNA sodium salt.

In view of the foregoing, it appears that conventional protocols for the cleavage, deprotection, and recovery of synthetic DNA are typically ammonia-based protocols, and commonly require on the order of 10 to 15 hours to complete. As seen by the above-described attempt by Beckman, there is an understanding that it would advantageous to be able to shorten the time required for cleavage/deprotection and recovery of synthetic DNA to on the order of one hour or less. Shorter processing times would provide significant advantages in terms of safety, speed, labor reduction, and ease of automation. What is clearly needed are reagents for the rapid cleavage/deprotection and recovery (neutralization/precipitation) of the entire samples of newly synthesized oligonucleotides, particularly those prepared via the phosphotriester and phosphoramidite synthetic route.

Co-pending international patent application Ser. No. PCT/US93/03123 describes and claims an apparatus and related process for performing automated or semi-automated operations in the course of the removal, recovery, deprotection, and/or purification (recovery) of biopolymer attached to a solid matrix that is contained in a reaction chamber commonly shaped as a column or cartridge. The apparatus allows the delivery of liquids containing chemicals and/or solvents into one end of the column, and the collection (i.e., recovery) of liquids at the opposite end of the column, e.g., for the collection of product. Preferred reagents are described as including a basic reagent for the cleavage deprotection step followed by a neutralizing reagent for precipitation of the oligomer.

SUMMARY OF THE INVENTION

The present invention provides a rapid process for the cleavage/deprotection and subsequent recovery (precipitation/neutralization) of newly synthesized oligonucleotides (e.g., DNA). In another embodiment, the invention provides reagents suitable for use in such a process, as well as a kit incorporating such reagents in a convenient, ready-to-use format. The process provides an alternative to the conventional procedures described above. The process of the present invention can lower the total processing time for newly synthesized DNA from many hours to on the order of one hour or less, and preferably thirty minutes or less. Such processing time is lowered without the need for additional equipment and without sacrificing the quality of the resultant DNA.

The invention provides a process for the cleavage, deprotection, neutralization and precipitation of synthesized oligonucleotides protected with N-acyl protecting groups from a solid support matrix comprising the steps of:

(a) immersing the support in a basic reagent solution of a type and concentration suitable to cause the cleavage of synthesized oligonucleotide from the support within about 15 minutes incubation at room temperature, and thereafter to cause the deprotection of the N-acyl protecting groups within about 24 hours incubation at room temperature, 6 hours incubation at 55° C., or about 45 minutes incubation at elevated temperatures up to 85° C., (b) incubating the solution under conditions suitable to cause the cleavage of substantially all synthesized oligonucleotide, (c) incubating the solution under conditions suitable to cause the deprotection of substantially all protecting groups from the cleaved oligonucleotide, (d) combining with the solution, at room temperature, an acidic or neutral reagent solution of a type, amount and concentration suitable to precipitate the cleaved, deprotected oligonucleotide from the combined solution within about 20 minutes incubation at room temperature, and (e) incubating the solution in order to precipitate substantially all cleaved, deprotected oligonucleotide.

In a preferred embodiment, the process of the invention allows the steps of cleavage, deprotection and precipitation to occur within about 5 minutes (room temperature), about 30 minutes (85 C), and about 10 minutes (room temperature), respectively, using traditional amidite chemistry. Using more labile chemistries, such as the Expedite chemistry described above, those preferred processing times can be reduced further, to on the order of about 5 minutes for each step at these temperatures. When used in reference to time, the word "precipitation" is intended to include the total time required for both the actual precipitation (i.e., incubation) of the sample, as well as the step of recovering the precipitated oligomer, which is typically accomplished by brief centrifugation. Typically, the precipitation steps of incubation and recovery are approximately equal in time (e.g., a 20 minute precipitation would include a 10 minute incubation followed by a 10 minute centrifugation step).

Also in a preferred embodiment, the process of the invention involves a multi-step process in which initial (cleavage and deprotection) steps are accomplished by the use of a basic reagent ("Reagent A") sufficient to raise the pH of the solution to between about pH 12 and about pH 14. The basic reagent can be provided in any suitable form, and is preferably one that provides a metal counter ion to the phosphate groups of the DNA. Sodium, potassium, calcium, and lithium salts are particularly useful. The reagent is preferably provided in an excess amount that is between about 5 and about 50 times the theoretical molar amount of DNA nucleotides present in the sample. In a preferred embodiment, the basic reagent is provided in the form of a 0.1 to 2 molar sodium hydroxide solution.

Reagent A can be modified with added cosolvents such as alcohols or non-interfering cosolvents. The term "non-interfering", as used in this application refers to reagents, or components thereof, that do not detrimentally affect the use of the described reagent or component for its intended purpose. An example of a preferred embodiment of a basic reagent incorporating the use of such a cosolvent is described as "Reagent P" herein. In a preferred embodiment, Reagent P contains 0.5M NaOH together with 10% of 2-propanol. The reagent allows effective cleavage from both controlled pore glass columns and polystyrene support or other organic polymer base supports.

In another embodiment of the invention, the cleavage of the oligonucleotide from the support and deprotection of the N-acyl protecting groups can be accomplished by the use of a combination of sodium hydroxide and ammonium hydroxide (e.g., including up to about 50% concentrated ammonium hydroxide). Applicants have discovered that cleavage is substantially completed within 5 minutes incubation at room temperature in a mixture of sodium hydroxide/ammonium hydroxide. Applicants have also found that the time required for deprotection, which has traditionally been thought to require many hours, can be reduced to on the order of 30 minutes or less in the process of the present invention using this mixture.

While not intending to be bound by theory, it would appear that the shortened time is made by possible by virtue of rapid cleavage by the sodium hydroxide of the ester bond linking the oligomer to the support, as well as the enhanced effects of sodium hydroxide and ammonium hydroxide in the deprotection of the oligonucleotide. At a molecular level, the cleavage of the ester bond is likely accomplished by hydrolysis with the stronger base and the deprotection is likely accomplished by the combined processes of hydrolysis by sodium hydroxide and ammonium hydroxide, and ammonolysis by the ammonium hydroxide.

Following cleavage and deprotection, the DNA is treated with neutralizing and precipitating reagent ("Reagent B"). Preferably the reagent is an acidic reagent, in the form of an acidic precipitating solvent (e.g., alcohol) reagent. Any non-interfering acid (i.e., substantially inert to DNA) can be used that is sufficient to neutralize the basic reagent, and obtain a pH of between about pH 6 and about pH 8.

The precipitating solvent that is used is preferably miscible with water, but one in which DNA itself is either insoluble or of limited solubility. As a result, the DNA is able to precipitate from the mixture of precipitating solvent and water. Preferred precipitating solvents for this purpose included alcohols such as propanol and isopropanol, as well as tetrahydrofuran, and other suitable non-aqueous solvents.

In situations in which dimethoxytrityl DNA ("DMT-DNA") is cleaved and deprotected, the resultant DMT-DNA can be precipitated by the use of precipitating solvent alone ("Reagent C"), that is, non-acidic solvent. Non-acidic precipitating solvent, such as 2-propanol or propanol, optionally containing up to 10% methanol, is preferred since the DMT-group is itself acid labile.

The use of the above-described basic/acidic precipitating solvent or basic/precipitating solvent steps with Applicants' previously-described apparatus offers a rapid processing approach without detrimentally affecting the quality of the final product. In a particularly preferred embodiment, the process of the invention is one that involves the use of a basic reagent for cleavage/deprotection, and either an acidic precipitating solvent reagent for precipitation/neutralization of DNA, or a non-acidic precipitating solvent reagent for the precipitation of DMT-DNA.

One added benefit of the use of the reagents of the present invention includes the fact that synthesized oligonucleotides can be readily recovered in the form of sodium, rather that ammonium, salts. Sodium salts of such oligomers are typically more readily useful for a variety of purposes, including for use in therapeutic applications (e.g., as injectables or for inhalation), and in the recently-developed antisense DNA technology.

In another preferred embodiment, reagents are provided for the rapid cleavage, deprotection and recovery of synthetic DNA, such reagents being particularly well suited for use on the apparatus described in copending application Ser. No. PCT/US93/03123.

DETAILED DESCRIPTION OF THE INVENTION

The present invention provides a process for the cleavage/deprotection and precipitation/neutralization (recovery) of newly synthesized oligonucleotides. In another embodiment, the invention provides reagents suitable for use in such a process, and to a kit incorporating such reagents in a convenient, ready-to-use format. By use of the process and reagents of the invention, synthesized oligonucleotides can be processed within a time frame that has not heretofore been available on a commercial basis to those in the field.

The process provides an alternative to the conventional ammonia-based procedures described above and in copending application Ser. No. PCT/US93/03123. The process of the present invention can lower the total processing time for newly synthesized DNA to on the order of one hour or less, and preferably thirty minutes or less, without the need for additional equipment or a sacrifice in the quality of the resultant DNA.

Reagent A, as described above, is particularly useful for cleaving DNA from hydrophilic supports such as silica and controlled pore glass ("CPG"). When using supports that have a more lipophilic character, for instance CPG or silica that have been chemically modified to render them more lipophilic, or supports such as polystyrene or other organic polymer supports, the reactivity of Reagent A alone may not be sufficient.

In such cases, Applicants have found that it is preferred to incorporate a wetting agent, such as an organic cosolvent into Reagent A. The resulting reagents (referred to herein as Reagent "P") preferably include an organic solvent such as 2-propanol as the wetting agent, however, any wetting agent can be used that is capable of wetting the support surface in a manner that does not interfere substantially with the use of the reagent for its intended purpose. The wetting agent is preferably added in an amount that is miscible with the basic solution yet sufficient to improve the wettability of the support and attached oligonucleotide. Suitable wetting agents are those that exhibit a solvation effect on the chemical bond to increase reactivity. The wetting agent (i.e., cosolvent) thus will have the function of a moderator ar accelerator of sodium hydroxide reactivity. Examples of suitable wetting agents include alcohols, ethers which are miscible with water, sulfoxides, sulfones, amides such as dimethyl formamide, phosphoramides such as trimethyl phosphoramide, nitriles such as acetonitrile, ethanolamines, hydrazine, hydroxylamine, ammonium hydroxide, and alkylamines, dialkylamines, and trialkylamines where the alkyl group is selected from the group consisting of methyl, ethyl, propyl, isopropyl, butyl, or iso-butyl. In general, solvents that are miscible with water can be considered as cosolvents or wetting agents. Examples of preferred wetting agents for use in the reagents and process of the present invention are selected from the group consisting of 2-propanol, propanol, acetonitrile, and mixtures thereof.

In the course of optimizing the cleavage reactivity of polymer supports, it has been found that Reagent P can also be used with CPG supports. The cleavage times of Reagent A and Reagent P on a CPG support are similar, with complete (i.e., >95%) cleavage within 5 minutes at room temperature. Cleavage of DNA from polystyrene support synthesis column with Reagent P is 95% complete within 5 minutes and the combination of Reagent A and concentrated ammonium hydroxide cleave DNA from CPG at 95% in 5 minutes as well.

Following cleavage and deprotection, the DNA is subjected to precipitation, centrifugation of the precipitated DNA, decanting of the supernatant, washing or rinsing of the precipitate, and finally, drying of the precipitate.

Precipitation can be accomplished by treating the deprotected DNA with an acidic or neutral precipitating solvent (e.g., alcohol) reagent (Reagent B). Any non-interfering reagent can be used that is substantially inert to DNA and sufficient to neutralize the basic reagent, in order to obtain a pH of between about pH 6 and about pH 8. The pH is not critical to the precipitation process, particularly when ammonium hydroxide is present, since the pH can be basic and the DNA will still precipitate from the mixture. Neutralization is preferred, particularly with fully deprotected DNA, since the presence of residual sodium hydroxide could interfere with subsequent molecular biology experiments. It is generally less critical that residual ammonium hydroxide be removed by neutralization, however, since the protocol suggests drying of the pelleted DNA, thereby removing any remaining traces of volatile ammonium hydroxide that may be present.

The precipitating solvent that is used is preferably one that is miscible with water, but one in which DNA itself is either insoluble or of limited solubility. As a result, the DNA is able to precipitate from the mixture of precipitating solvent and water. Preferred precipitating solvents for this purpose included alcohols such as propanol and isopropanol, as well as tetrahydrofuran, and other suitable non-aqueous solvents.

In situations in which DMT-DNA is cleaved and deprotected, the resultant DMT-DNA can be precipitated by the use of precipitating solvent alone (Reagent C), that is, non-acidic solvent. Non-acidic precipitating solvent, such as 2-propanol, is preferred since the DMT-group is itself acid labile.

The use of the above-described acidic or non-acidic precipitating solvents with the apparatus described in Applicant's above-cited copending application offers a rapid processing approach without detrimentally affecting the quality of the final product. In a particularly preferred embodiment, the process of the invention is a non-ammonia based one that involves the use of a base reagent for cleavage/deprotection, and either an acidic precipitating solvent reagent for precipitation/neutralization of DNA, or a non-acidic precipitating solvent reagent for the precipitation of DMT-DNA.

In another preferred embodiment, non-ammonia based reagents are provided for the rapid cleavage, deprotection and recovery of synthetic DNA, such reagents being particularly well suited for use on such an apparatus. Such embodiments of the process of the present invention are facilitated by the automated nature of the apparatus. The DNA producer or DNA user is able to automate the routine manual operations that follow solid phase synthesis, without sacrificing product quality. For instance, the total processing time for DNA can be reduced to on the order of one hour, thereby freeing up critical laboratory equipment for other purposes, and allowing the researcher to use the synthesized DNA the same day it is made.

The present invention provides a process and related reagents useful for the removal, recovery, deprotection, and/or purification of biopolymer such as oligodeoxyribonucleotides, oligoribonucleotides, oligosaccharides, and peptides from a solid matrix contained in a chamber in the shape of a column.

"Biopolymer", as referred to herein, can be of any desired type and size, e.g., nucleic acid, protein, lipoprotein, polysaccharide, lipopolysaccharide, and combinations thereof. Biopolymer can be "attached" by any means, or combination of means, suitable for its intended use, e.g., through chemical bond attachment, affinity attachment, ion exchange attachment, or through size exclusion attachment.

Columns can contain solid matrices in the form of, for instance, particles (such as solid, porous, or hollow beads), permeable or impermeable membranes, stable emulsified droplets, and solid support surfaces in any desired configuration. The most commonly used DNA synthesis columns are of controlled pore glass type with pore sized of 500 A and 1000 A. The 500 A columns are generally used for DNA shorter than 50 nucleotides and 1000 A columns are used for DNA longer than 50 nucleotides. Polystyrene columns, such as are available from Applied Biosystems, Inc., currently are recommended for any size DNA. The amount of DNA on these columns range from 30 nmol to 1 micromole for regular laboratory DNA synthesis. The amount of DNA that can be synthesized on the column is determined, at least in part, by the amount of solid support and the total functionalization on the column, i.e., the amount of nucleoside attached to the column prior to the start of the synthesis. Large scale columns are also available, with capacities that range typically from 10 micromole to 20 micromole. Even larger scale synthesis is possible in a batch-like approach and the amount of support is only limited by the apparatus used for the synthesis. Commercial scale synthesis of 1000 micromole is used by pharmaceutical companies and even larger scales is anticipated when antisense DNA technology finds wider use in therapeutic medical applications.

The invention will now be described with reference to the following non-limiting Examples. Unless otherwise apparent, references to an apparatus or assembly refer to that described in Applicant's above-cited copending application, the disclosure of which is incorporated herein by reference.

EXAMPLES

Example 1

Basic/Acidic Precipitating Solvent Reagents for Use in Non-ammonia Processing

The process of the present invention provides an alternative to the use of ammonium hydroxide in the cleavage and deprotection of newly synthesized DNA. Reagents were prepared and used in the following manner.

Specifically, Reagent A was prepared as aqueous sodium hydroxide at 0.5 Molar concentration (2 g in 100 mL). A concentration range of 0.1–2.0 Molar was expected to be acceptable in the protocol. The 15-minute cleavage time from the column was initially considered optimal, although 5 minutes has been shown to be sufficient. At higher concentrations of the reagent, the cleavage will occur more rapidly.

A deprotection time of 30 minutes at 85° C. was assumed fairly optimal, although a shorter time, e.g., on the order of about 10 to about 15 minutes will be sufficient. Using higher concentrations of sodium hydroxide, the deprotection time can be shortened. At a temperature of about 55° C., the deprotection was complete within 6 hours. The optimal times for such purposes was determined by comparing the product profiles on capillary electrophoresis with samples obtained from the regular ammonium hydroxide deprotection protocol at 55° C., using model sequences of DNA, 20 nucleotides long and by HPLC analysis of DMT-DNA.

The Reagent B (precipitation and neutralizer) was prepared as 40 g of concentrated acetic acid in 4 liter of 2-propanol (final reagent being 1% acetic acid, by weight). By using 5 volumes of that solution to 1 volume of cleavage/deprotection Reagent A, the mixture was neutralized to sodium acetate and the excess solvent precipitated the DNA. The sodium acetate at that concentration did not appear to precipitate measurably with the DNA.

When lipophilic DMT (dimethoxytrityl) group was kept on the DNA for further affinity chromatography (purification) of the DNA, Reagent C (neat 2-propanol or 2-propanol with 5% methanol) was used instead of Reagent B. The acetic acid was omitted since the DMT-group is acid labile.

When the protocol has been optimized, evaluation of the recovered DNA by capillary electrophoresis and HPLC, i.e., demonstrates that products of the automated protocol of the present invention are indistinguishable from those derived from the well established ammonium hydroxide deprotection protocol.

The DNA was further analyzed by snake venom digestion. The DNA was cleaved into monomers using snake venom phosphodiesterase and then treated with alkaline phosphatase to form four nucleosides in the sequence. The mixture was analyzed by HPLC (high performance liquid chromatography). The composition of nucleosides in samples using the non-ammonia based protocol were basically indistinguishable from the composition of the same sequence protected using a standard ammonium hydroxide deprotection protocol. Both preparations show small amounts of inosine and deoxyuridine which occur from deamination of adenosine and cytosine, however the amounts were sufficiently small that the HPLC did not integrate the peaks. Subjectively, the sodium hydroxide sample had slightly more of these components than ammonium hydroxide. Finally, the DNA prepared using the non-ammonium hydroxide based protocol was used in several molecular biology experiments, e.g., as sequencing primers, PCR primers, probes, and primer extensions, and appeared to perform as well as that prepared using the protocol involving ammonium hydroxide.

The precipitation of synthesized DNA using the present non-ammonia reagents seemed to work particularly well, perhaps because the sodium salt of DNA is less soluble in organic solvents, as compared to the ammonium salt that is obtained when ammonium hydroxide is used in the deprotection protocol.

After the completion of DNA synthesis, the protocol described herein allowed for the DNA to be ready for molecular biology experiments in about 1 hour. This is a dramatic improvement in processing time, in fact it is an order of magnitude faster than traditional protocols using ammonium hydroxide and phosphotriester chemistry. The use of this protocol on the apparatus described makes the entire synthetic operation automatic and more efficient.

Example 2

Cleavage, Deprotection, and Recovery of Fully Deprotected Synthetic DNA

Synthesized oligonucleotide was cleaved, deprotected and recovered according to the following protocol.
Materials:
  Reagent A (GREEN): cleavage and deprotection solution.
  Reagent B (RED): precipitation and neutralizing solution.

The reagents are prepared as described in Example 1 above, and are stored at room temperature. The reagents should only be used in accordance with accepted safety practices and precautions, including in a vented area, wearing personal protective equipment, and avoiding use near open flames or high temperatures.
Procedure for Fully Deprotected DNA at 0.2 micromolar scale (For a 1.0 micromolar DNA synthesis, use 1 mL of Reagent A (GREEN). Divide the product mixture into four centrifuge tubes of 0.25 mL samples each. For a 30–50 nmol synthesis, follow the procedure for a 0.2 micromolar (200 nmol) DNA synthesis.)

1. Fill a 3-mL syringe (plastic type with a luer slip tip) with 0.5 mL of Reagent A (GREEN), follow by pulling up 0.5 mL of air. The volume of air will ensure that the void volume in the column is completely emptied during the cleavage step.

Connect the syringe to the synthesis column and connect an empty syringe at the other end of the column. Gently push the plungers on the syringes before starting the procedure to make sure that they will move smoothly.

Feed in about 0.2 mL of reagent and let stand for 5 minutes. Then, feed another 0.2 mL of reagent and let stand 10 minutes. Finally, feed in the remaining 0.1 mL including the air bubble to ensure the void volume is emptied.

When the cleavage is complete, transfer the product mixture in the receiving syringe to a 1.5-mL microcentrifuge tube (Eppendorf®-type (Eppendorf-Netheler-Hinz GmbH)) and incubate in an oven or water bath at 85° C. for 30 minutes. Allow the reaction tube to cool (about 5 minutes).

2. Transfer half of the reaction mixture into a second centrifuge tube.

Add 5 volumes (1.25 mL, or as much as the centrifuge will hold) of Reagent B (RED). Vortex for 30–60 seconds. At this point, the mixture will usually become slightly cloudy. Let stand for 10–20 minutes in a freezer.

3. Centrifuge at 15,000 rpm for 10 minutes. Even sequences as short as 15 nucleotides long will precipitate readily.

4. After the centrifugation, decant the solution and allow the tube dry for a few seconds upside down. Dry the pellet in a low oven (<50° C.) or in a Speedvac® instrument (Savant Instruments, Inc.) under vacuum; this will turn the glass-like pellet into a white pellet. The DNA is now ready for quantification and use in molecular biology applications.

(If however, there is no immediate need for the DNA, the following simple procedure will turn the pellet into a flocculent precipitation—like a cotton-ball of DNA. Wash the pellet with 70% aqueous ethanol (3×0.3 mL), making sure the pellet does not come loose (otherwise, centrifuge again). Let the centrifuge tube rest upside down for a few seconds to dry the pellet. Next, take up the pellet in 50–100 µL of water, and dissolve by heating in a water bath for 5 minutes at 35°–50° C. Centrifuge, and cool to room temperature. concentrate at reduced pressure for 1–2 hours in a Speedvac®.

When the protocol set forth above was performed, the resultant product had the appearance of a cotton ball of DNA. The recommended cleavage time of 15 minutes has since been shortened to on the order of 5 minutes or less. Even though a cleavage time of 15 minutes was used above, this Example demonstrates that it is possible to complete the entire protocol within about one hour.

Example 3

Protocol for Rapid Cleavage, Deprotection, and Recovery of DMT-DNA

Synthesized DMT-DNA was cleaved, deprotected, and recovered according to the following protocol.
Materials:
  Reagent A (GREEN): cleavage and deprotection solution.
  Reagent C (YELLOW): precipitation solution for DMT-DNA.

The reagents are prepared as described in Example 1 above, and are stored at room temperature. The reagents should only be used in accordance with accepted safety practices and precautions, including in a vented area, wearing personal protective equipment, and avoiding use near open flames or high temperatures.
Procedure for DMT-DNA at 0.2 micromolar scale For a 1.0 micromolar DNA synthesis, use 1 mL of Reagent A (GREEN). Divide the product mixture into four centrifuge tubes of 0.25 mL samples each. For a 30–50 nmol synthesis, follow the procedure for a 0.2 micromolar (200 nmol) DNA synthesis.

1. Fill a 3-mL syringe (plastic type with a luer slip tip) with 0.5 mL of Reagent A (GREEN), follow by pulling up 0.5 mL of air (to ensure that the void volume in the column is completely emptied during the cleavage step).

Connect the syringe to the synthesis column and connect an empty syringe at the other end of the column. Gently push the plungers on the syringes before starting the procedure to make sure that they will move smoothly.

Feed in about 0.2 mL of reagent and let stand for 5 minutes. Then, feed another 0.2 mL of reagent and let stand 10 minutes. Finally, feed in the remaining 0.1 mL including the air bubble to ensure the void volume is emptied.

When the cleavage is complete, transfer the product mixture in the receiving syringe to a 1.5-mL microcentrifuge tube (Eppendorf®-type) and incubate in an oven or water bath at 85° C. for 30 minutes. Allow the reaction tube to cool (about 5 minutes).

2. Transfer half of the reaction mixture into a second centrifuge tube.

Add 5 volumes (1.25 mL, or as much as the centrifuge will hold) of Reagent C (YELLOW). Vortex for 30–60 seconds. At this point, the mixture will usually become slightly cloudy. Let stand for 10–20 minutes in a freezer.

3. Centrifuge at 15,000 rpm for 10 minutes. Even sequences as short as 15 nucleotides long will precipitate readily.

4. After the centrifugation, decant the solution and allow the tube dry for a few seconds upside down.

Wash the pellet with 70% aqueous ethanol (3×0.3 mL), making sure the pellet does not come loose (otherwise, centrifuge again). Let the centrifuge tube rest upside down for a few seconds to dry the pellet. The DNA is now ready for cartridge or HPLC purification.

5. Take the pellet up in 0.1M triethylammonium acetate, isolate by HPLC.

Alternatively, the pellet may be taken up in 10% aqueous ammonium hydroxide (or preferentially, 0.1M triethylammonium acetate) and isolate by cartridge purification.

As in Example 2 with respect to fully-deprotected DNA, when the protocol set forth above was performed cleavage was accomplished within 15 minutes incubation of DMT-DNA and Reagent A.

Example 4

Automated Cleavage and Deprotection of Synthetic DNA

The following procedure was used for the cleavage and deprotection of DNA by use of the above-described Reagents (deprotection at 85° C.). It is applicable for DNA synthesis columns presently commercialized by Beckman Instruments (Oligo 1000 DNA Synthesizer).

1. Connect the 12 volt power supply on top of the unit. Then, connect the 120 VAC wall plug.

2. Set the total time of the operation to 60 minutes (20 minutes cleavage+40 minutes deprotection) on the electronic time (red). Turn the (+/−) knob clockwise to the desired time. Upon completion of the operation, the time beeps 6 times and the window becomes dark.

The set time is stored in the memory. For the next operation, push the (on/off) button once, and the time window will show the present time of 60 minutes. If a new time is used, set the timer with the (+/−) knob.

3. Set the cleavage time on the time relay (grey) by turning the knob to 2. The scale is set at 0–60 minutes; i.e., 1=10 min, 2=20 min, 3=30 min, 6=60 min.

4. Pre-set adjustments have been made for 3-mL "B-D" syringes (plastic disposable syringes with luer slip tips).

5. For 0.2 micromolar synthesis: Fill the syringe with 0.5 mL of Reagent A (green), followed by pulling up 0.5 mL of air. The volume of air will ensure that the void volume in the column is completely emptied during the cleavage step. Tightly connect the syringe to the Beckman column-vial assembly, and put the assembly on the machine, with the syringe in the holder and the vial in the heating block.

For 30 or 50 Nmol synthesis: Follow the procedure for 0.2 micromolar synthesis.

For 1 micromolar synthesis: Use 1.0 mL of Reagent A.

6. Adjust the cross-bar against the syringe plunger and gently tighten the cross-bar handle (not too hard). Fasten the splash guard on the unit.

7. Start the operation by pushing the (on/off) button once.

8. During the cleavage operation, the relay is blinking a red light. When the relay switches to the heating mode after the cleavage is completed, two solid red lights are shown. When the total time has elapsed (the remaining time is seen at the timer window), the timer turns the unit off, and the window becomes dark.

9. Allow the heating block to cool 10 minutes before removing the syringe-column-vial assembly from the machine. Allow the vial to cool to room temperature before precipitation of the DNA.

10. Continue with step #2 in the protocol for the precipitation and recovery of the DNA.

When performed, the protocol set out in this Example again demonstrated that rapid cleavage and deprotection could be accomplished using the reagents of the present invention in an automated format. If anything, the automated procedure takes somewhat longer than the corresponding manual procedure, in part because the void volume in the column which can be displaced manually and instantaneously with a syringe, whereas the automated format feeds the air bubble into the column at the same rate it feeds the reagents.

Example 5

Cleavage, Deprotection and Recovery of Fully Deprotected Synthetic DNA

Controlled Pore Glass (CPG) Synthesis Columns Only

Synthetic DNA was cleaved, deprotected and recovered from a CPG support according to the following protocol.
Materials:

1010 DNA MATE™ Reagent A (GREEN): cleavage and deprotection solution

1040 DNA MATE™ Reagent B (RED): precipitation and neutralizing solution

Procedure for Fully Deprotected DNA at 20–100 nMol scale

1. Completely remove residual acetonitrile from the synthesis column (this can be accomplished by using an air-filled syringe to flush the column). Fill a 3-mL syringe (plastic type with a Luer slip tip) with 0.5 mL of Reagent A (GREEN); follow by pulling up 0.5 mL of air. The volume of air will ensure that the void volume in the column is completely emptied during the cleavage step.

2. Connect the syringe to the synthesis column and connect an empty syringe at the other end of the column. Gently push the plungers on the syringes before starting the procedure to make sure that they will move smoothly.

3. Use the syringes to push the reagent back and forth, 3 to 4 times over the course of 5 minutes. Make sure the support is wetted by the reagent.

4. When the cleavage is complete, transfer the solution to a 1.5-mL microcentrifuge tube (Eppendorf®-type) and incubate in a water bath at 85° C. For DNA made by the standard cyanoethyl (CE) amidites, treat for 30 min. For DNA made by Expedite™ amidites and PAC amidites, treat for 5 and 10 min, respectively.

5. Allow the reaction mixture to cool to room temperature. Transfer half of the reaction mixture into a second centrifuge tube.

6. Add 5 volumes 1.25 mL, or as much as the centrifuge tube will hold) of Reagent B (RED) to each tube. Vortex for 10–15 seconds. At this point, the mixture will usually become slightly cloudy. Allow the mixture to stand 10–20 minutes in a freezer (only minimal loss of DNA will be encountered by proceeding directly to the next step).

7. Centrifuge at 15,0000 rpm for 2 min. Even sequences as short as 15-nucleotides long will precipitate readily.

8. After the centrifugation, decant the solution and wash with ethanol. Allow the tube to dry for a few seconds upside down, or dry the pellet in a low over (<50° C.) or in a Speedvac® under vacuum; this will turn the glass-like pellet into a white pellet. The DNA is now ready for quantification and use in molecular biology applications. Make sure the DNA is completely dissolved before use.

In order to compare the reagents of the present invention with the 50:50 methanol:NaOH solution described by Koster, the protocol described above was repeated using methanol in combination with Reagent A. In one experiment, the protocol was performed using a solution containing a 1:1 combination of methanol and 0.5 molar NaOH, for a final concentration of 0.25 molar NaOH and 50% methanol. In another experiment, a 0.5 molar sodium hydroxide solution was prepared in a 4:1 ratio with methanol, for a final methanol concentration of 20% and a final sodium hydroxide concentration of 0.4 molar.

In both experiments cleavage was found to be 95% complete within 5 minutes at room temperature, and deprotection was found to be complete within 30 minutes to 1 hour at 85° C. The DNA was easily recovered using the precipitation procedure described above.

The deprotection reaction was followed over a period of 60 minutes using DMT-DNA, which was injected from the reaction mixture and analyzed by reversed phase chromatography on System Gold (Beckman) HPLC instrument using a gradient from 10% to 50% acetonitrile in 0.1 molar trietylammonium acetate. The DNA was monitored at 245 nm UV absorption.

Reagents should be stored at room temperature, with their caps tightly closed after each operation. For a 1.0 micromolar DNA synthesis, use 1 mL of Reagent A (GREEN). Divide the product mixture into four centrifuge tubes of 0.25 mL samples each. For use with DNA MATE™ equipment systems. DNA made by Expedite™ and PAC amidites may foam during cleavage (due to the detergent-like character of the protecting group). To prevent some loss of the sample should this occur, gently pull the plunger to generate a negative pressure before disconnecting the sample syringe from the column.

DNA MATE™ is a trademark of Barrskogen, Inc. Eppendorf® is a registered trademark of Eppendorf-Netheler-Hinz GmbH. Speedvac® is a registered trademark of Savant Instruments, Inc. Expedite™ is a trademark of Millipore Corporation.

When the protocol set out in this Example was performed, it demonstrated that rapid processing could be accomplished using regular amidites. The total processing time can be reduced to 40 minutes. As an added benefit, the heating of the aqueous sodium hydroxide does not generate any significant pressure in the tube. Deprotection can be performed with a snap-fit cover on a centrifuge tube, whereas a standard ammonium hydroxide protocol requires a strong screw capped tube in order to withstand the pressure build up.

Example 6

Cleavage, Deprotection and Recovery of Fully Deprotected Synthetic DNA from Polystyrene Synthesis Columns Synthesized DNA was cleaved, deprotected, and recovered from polystyrene columns by the following protocol.

Materials:
1020 DNA MATE™ Reagent P (WHITE): cleavage and deprotection solution
1040 DNA MATE™ Reagent B (RED): precipitation and neutralizing solution Procedure for Fully Deprotected DNA at 20–200 nMol scale 1. Completely remove residual acetonitrile from the synthesis column (this can be accomplished by using an air-filled syringe to flush the column). Fill a 3-mL syringe (plastic type with a Luer slip tip) with 0.5 mL of Reagent P (WHITE); follow by pulling up 0.5 mL of air. The volume of air will ensure that the void volume in the column is completely emptied during the cleavage step.

2. Connect the syringe to the synthesis column and connect an empty syringe at the other end of the column. Gently push the plungers on the syringes before starting the procedure to make sure that they will move smoothly.

3. Use the syringes to push the reagent back and forth, 3 to 4 times over the course of 5 minutes. Make sure the support is wetted by the reagent.

4. When the cleavage is complete, transfer the solution to a 1.5-mL screw cap centrifuge tube and incubate in a water bath at 85° C. For DNA made by the standard cyanoethyl (CE) amidites, treat for 45 min. For DNA made by Expedite™ amidites and PAC amidites, treat for 10 and 15 min. respectively.

5. Allow the reaction mixture to cool to room temperature. Transfer half of the reaction mixture into a second centrifuge tube.

6. Add 5 volumes (1.25 mL, or as much as the centrifuge tube will hold) of Reagent B (RED). Vortex for 10–15 seconds. At this point, the mixture will usually become slightly cloudy. Allow the mixture to stand 10–20 minutes in a freezer (only minimal loss of DNA will be encountered by proceeding directly to the next step).

7. Centrifuge at 15,000 rmp for 2 min. Even sequences as short as 15-nucleotides long will precipitate readily.

8. After the centrifugation, decant the solution and wash with ethanol. Allow the tube to dry for a few seconds upside down, or dry the pellet in a low over (<50° C.) or in a Speedvac® under vacuum; this will turn the glass-like pellet into a white pellet. The DNA is now ready for quantification and use in molecular biology applications. Make sure the DNA is completely dissolved before use.

When the protocol set forth above was performed it was determined that Reagent A did not cleave efficiently from the polystyrene support synthesis column. The lipophilic character of the support and the protected DNA on the column may not allow the ester bond to be cleaved due to possible hydrophobic interactions. It was found that cleavage efficiency could be increased by the addition of a wetting reagent to the reagent. 10% 2-propanol gave good cleavage kinetics, providing 95% cleavage in 5 minutes. Since the added 2-propanol slightly affected the deprotection kinetics, the deprotection time was increased 50% compared to reagent A, to 45 min at 85° C. for DNA made by standard amidites.

Example 7

Cleavage, Deprotection and Recovery of DMT-DNA from Controlled Pore Glass (CPG) Synthesis Columns DMT-DNA was cleaved, deprotected, and recovered from CPG support by the following protocol.

Materials:

1010 DNA MATE™ Reagent A (GREEN): cleavage and deprotection solution

1070 DNA MATE™ Reagent C (YELLOW): precipitation solution for DMT-DNA

Procedure for DMT-DNA at 20–200 nMol scale

1. Completely remove residual acetonitrile from the synthesis column (this can be accomplished by using an air-filled syringe to flush the column). Fill a 3-mL syringe (plastic type with a Luer slip tip) with 0.5 mL of Regent A (GREEN); follow by pulling up 0.5 mL of air (to ensure that the void volume in the column is completely emptied during the cleavage step).
2. Connect the syringe to the synthesis column and connect an empty syringe at the other end of the column. Gently push the plungers on the syringes before starting the procedure to make sure that they will move smoothly.
3. Use the syringes to push the reagent back and forth, 3 to 4 times over the course of 5 minutes. Make sure the support is wetted by the reagent.
4. When the cleavage is complete, transfer the solution to a 1.5-mL microcentrifuge tube (Eppendorf®-type) and incubate in a water bath at 85° C. For DNA made by the standard cyanoethyl (CE) amidites, treat for 30 min. For DNA made by Expedite™ amidites and PAC amidites, treat for 5 and 10 min, respectively.
5. Allow the reaction mixture to cool to room temperature. Transfer half of the reaction mixture into a second centrifuge tube.

Add 5 volumes 1.25 mL, or as much as the centrifuge tube will hold) of Reagent C (YELLOW). Vortex for 10–15 seconds. At this point, the mixture will usually become slightly cloudy. Allow the mixture to stand 10–20 minutes in a freezer.

6. Centrifuge at 15,000 rpm for 10 minutes. Even sequences as short as 15-nucleotides long will precipitate readily.
7. After the centrifugation, decant the solution and wash the pellet with ethanol, making sure the pellet does not come loose (otherwise, centrifuge again). Let the centrifuge tube rest upside down for a few seconds to try the pellet. The DNA is now ready for cartridge or HPLC purification.
8. Take the pellet up in 0.1M triethylammonium acetate. Make sure the DNA is completely dissolved.

This Example demonstrates that DMT-DNA can be cleaved within 5 minutes, in order to provide a total processing time, from cleavage to precipitation, of on the order of one hour or less for standard amidites, and 15 minutes or less for more labile amidites.

Example 8

Cleavage, Deprotection and Recovery of DMT-DNA from Polystyrene Synthesis Columns DMT-DNA was cleaved, deprotected, and recovered from polystyrene columns by the following protocol.

Materials:

1020 DNA MATE™ Reagent P (WHITE): cleavage and deprotection solution

1070 DNA MATE™ Reagent C (YELLOW): precipitation solution for DMT-DNA

Procedure for DMT-DNA at 20–200 nMol scale

1. Completely remove residual acetonitrile from the synthesis column (this can be accomplished by using an air-filled syringe to flush the column). Fill a 2-mL syringe (plastic type with a Luer slip tip) with 0.5 mL of Reagent P (WHITE); follow by pulling up 0.5 mL of air (to ensure that the void volume in the column is completely emptied during the cleavage step).
2. Connect the syringe to the synthesis column and connect an empty syringe at the other end of the column. Gently push the plungers on the syringes before starting the procedure to make sure that they will move smoothly.
3. Use the syringes to push the reagent back and forth, 3 to 4 times over the course of 5 minutes. Make sure the support is wetted by the reagent.
4. When the cleavage is complete, transfer the solution to a 1.5-mL screw cap centrifuge tube and incubate in a water bath at 85° C. For DNA made by the standard cyanoethyl (CD) amidites, treat for 45 min. For DNA made by Expedite™ amidites and PAC amidites, treat for 10 and 15 min, respectively.
5. Allow the reaction mixture to cool to room temperature. Transfer half of the reaction mixture into a second centrifuge tube.
6. Add 5 volumes (1.25 mL, or as much as the centrifuge tube will hold) of Reagent C (YELLOW). Vortex for 10–15 seconds. At this point, the mixture will usually become slightly cloudy. Allow the mixture to stand 10–20 minutes in a freezer. Centrifuge at 15,000 rpm for 10 minutes. Even sequences as short as 15-nucleotides long will precipitate readily.
7. After the centrifugation, decant the solution and wash the pellet with ethanol, making sure the pellet does not come loose (otherwise, centrifuge again). Let the centrifuge tube rest upside down for a few seconds to dry the pellet. The DNA is now ready for cartridge or HPLC purification.
8. Take the pellet up in 0.1M triethylammonium acetate. Make sure the DNA is completely dissolved.

This Example demonstrates that the use of Reagent P for the cleavage/deprotection of DMT-DNA required an additional 15 minutes of deprotection at 85° C. as compared with Reagent A.

Example 9

Expedite™ and PAC Amidite Chemistry Cleavage, Deprotection and Recovery of Fully Deprotected Synthetic DNA at Room Temperature or 55° C.

DNA was cleaved, deprotected and recovered using a combination mixture of sodium hydroxide and concentrated ammonium hydroxide according to the following protocol.

Materials:

1010 DNA MATE™ Reagent A (GREEN): cleavage and deprotection solution and CONCENTRATED Ammonium hydroxide

1040 DNA MATE™ Reagent B (RED): precipitation and neutralizing solution

Procedure for Fully Deprotected DNA at 20–200 nMol scale

1. Completely remove residual acetonitrile from the synthesis column (this can be accomplished by using an air-filled syringe to flush the column). Fill a 3-mL syringe (plastic type with a Luer slip tip) with 0.5 mL of Reagent A (GREEN); follow by pulling up 0.5 mL of air. The volume of air will ensure that the void volume in the column is completely emptied during the cleavage step.

Connect the syringe to the synthesis column and connect another syringe filled with 0.5 mL of Ammonium hydroxide at the other end of the column.

Use the syringes to push the reagent back and forth, 3 to 4 times over the course of 5 minutes. Make sure the support is wetted by the reagent.

When the cleavage is complete, transfer 1 mL of the solution to a 1.5-mL microcentrifuge tube with screw cap and incubate in a water bath, 55° C. for 15 minutes, allow the tube to cool off before opening the tube.

Alternatively, leave the syringe-column-syringe assembly at room temperature for 2 hours to complete the deprotection step.

2. Place 1 mL of DNA MATE™ Reagent B (RED) into a 1.5-mL microcentrifuge tube. To the tube, add 0.5-mL of the DNA-containing Reagent A/ammonium hydroxide solution. Vortex for 10–15 seconds.

At this point, the mixture will usually become slightly cloudy. Allow the mixture to stand 10–20 minutes in a freezer (only minimal loss of DNA will be encountered by proceeding directly to the next step).

If the solution does not turn cloudy, increase the amount of Reagent B by transferring half the amount in the tube to a second centrifuge tube and filling up both tubes with more Reagent B. Vortex another 10–15 seconds. Allow the tubes to stand in a freezer for 30 minutes.

3. Centrifuge at 15,000 rpm for 2 min.

4. After the centrifugation, decant the solution and wash with ethanol. Allow the tube to dry for a few seconds upside down, then dry the pellet in a Speedvac® under vacuum; this will turn the glass-like pellet into a white pellet. The DNA is now ready for quantification and use in molecular biology applications. Make sure the DNA is completely dissolved before use The present invention demonstrates that a cleavage/deprotection/precipitation protocol can be performed using standard amidites within about 30 minutes or less. This is a striking difference as compared to conventional procedures using standard amidites. Even using Expedite brand amidites such procedures still require on the order of 15 minutes, and these amidites are considerably more expensive and potentially more labile than the standard amidites. Additionally, by adding ammonium hydroxide to the cleavage/deprotection reagent of the present invention it is possible to perform this protocol at 55° C. which may be viewed as a benefit to some researchers.

Example 10

Removal of Support Material

The following protocol is useful for the cleavage/deprotection and precipitation of DNA from the matrices of opened synthesis columns. The removal of support material is typically not recommended however, since it tends to be impractical and can result in the loss of material. Following synthesis, residual acetonitrile in the column is removed. The column is opened and the support is poured into a screw cap centrifuge tube and Reagent A or Reagent P or Reagent A plus ammonium hydroxide 50% or Reagent P plus ammonium hydroxide 50% is added (0.5 ml) for 0.2 micromolar scale (volumes can be adjusted for other scales according to previous protocols). The screw cap is tightened and the tube put in a water bath at 85° C. for 30 minutes, or 70° C. for 2 hour or 55° C. for 6 hours for regular amidites A(bz), C(bz) and G(i-bu). If Expedite- or Pac-brand amidites are used in the synthesis use 85° C. for 5 and 10 min respectively, or 70° C. for 20 and 30 minutes respectively, or 55° C. at 30 and 45 minutes respectively.

The tube is then removed and cooled. The tube is centrifuged to separate the solid support from the supernatant, the latter containing the reagent plus the deprotected DNA. The supernatant 0.25 ml is transferred to two other centrifuge tubes and 5 volumes of Reagent B or Reagent C is added, depending on the final product (Reagent B for fully deprotected DNA and Reagent C for DMT-DNA). Vortex the mixture for 15 seconds, let stand at room temperature for 10 min or place in a freezer for 10–20 minutes. Centrifuge again at about 15,000 RPM, decant the supernatant, wash with ethanol and dry up side down or dry the pellet under vacuum.

The DNA is now ready for molecular biology applications or ready for purification if the DMT-DNA is used. Make sure the pellet is completely dissolved before proceeding to the next step.

While only certain embodiments of the present invention have been described in specific details, it will be apparent to those skilled in the art, that many other specific embodiments may be practiced and many changes made, all within the spirit of the invention and the scope of the appended claims:

What is claimed is:

1. A process for the cleavage, deprotection, and recovery of a synthetic oligonucleotide comprising guanosine bases protected with base labile protecting groups selected from the group consisting of isobutyryl groups and phenoxyacetyl groups, wherein the oligonucleotide is synthesized on a solid support matrix, the process comprising the steps of:

(a) immersing the support in a basic reagent solution, comprising a sodium, potassium, calcium or lithium salt, of a type and concentration suitable to cause the cleavage of synthesized oligonucleotide from the support within about 5 minutes incubation at room temperature, and thereafter to cause the deprotection of isobutyryl groups within about 30 minutes and of phenoxyacetyl groups within about 10 minutes, at elevated temperatures up to 85°, b) incubating the solution for about 5 minutes or less under conditions suitable to cause the cleavage of substantially all synthesized oligonucleotide, c) incubating the solution for about 30 minutes or less under conditions suitable to cause the deprotection of substantially all protecting groups from the cleaved oligonucleotide, d) combining with the solution, at room temperature, a precipitating solvent reagent, comprising between about 0.5% and 5% acetic acid in an alcohol selected from the group consisting of 2-propanol, propanol, ethanol, butanol, and ethanolamine, suitable to precipitate the cleaved, deprotected oligonucleotide from the combined solution within about 10 minutes incubation at room temperature, e) incubating the combined solution in order to precipitate substantially all cleaved, deprotected oligonucleotide within about 10 minutes.

2. A process according to claim 1 wherein the basic reagent comprises a solution of 0.1 molar to 2 molar sodium hydroxide.

3. A process according to claim 2 wherein the basic reagent further comprises a wetting agent.

4. A process according to claim 3 wherein the wetting agent comprises 2-propanol, present at a concentration of 10% in the acidic reagent solution, based on the volume of the solution.

5. A process according to claim 1 wherein the oligonucleotide has been synthesized by the use of phosphotriester nucleotides.

6. A process according to claim 1 wherein the oligonucleotide has been synthesized by the use of phosphoramidite nucleotides.

7. A process according to claim 1 wherein the cleaved, deprotected, precipitated oligonucleotide is present as a sodium salt.

8. A process according to claim 7 wherein the oligonucleotide is an antisense DNA sequence.

9. A process according to claim 1 wherein the oligonucleotide is a phosphorothioate DNA derivative.

10. A reagent kit useful for the cleavage, deprotection, and recovery of synthetic oligonucleotides protected with base labile protecting groups selected from the group consisting of isobutyryl groups and phenoxyacetyl groups and synthesized on a solid support matrix, the reagent kit comprising:

(a) a basic reagent solution, comprising a sodium, potassium, calcium or lithium salt, of a type and concentration suitable to cause the cleavage of synthesized oligonucleotide from the support within about 5 minutes incubation at room temperature, and thereafter to cause the deprotection of isobutyl groups within about 30 minutes incubation and of phenoxyacetyl groups within about 10 minutes incubation at elevated temperatures up to 85° C., and (b) a precipitating solvent reagent comprising between about 0.5% and 5% acetic acid in an alcohol selected from the group consisting of 2-propanol, propanol, ethanol, butanol, and ethanolamine suitable to precipitate the cleaved, deprotected oligonucleotide from the combined solution with about 10 minutes incubation at room temperature.

11. A reagent kit according to claim 10 wherein the basic reagent is a solution of 0.1 molar to 2 molar sodium hydroxide.

* * * * *